United States Patent
Sakowicz et al.

(10) Patent No.: US 11,228,594 B2
(45) Date of Patent: Jan. 18, 2022

(54) AUTOMATIC REDUCTION OF PERMISSIONS FOR CLIENT APPLICATIONS

(71) Applicant: MICROSOFT TECHNOLOGY LICENSING, LLC., Redmond, WA (US)

(72) Inventors: Jeffrey Thomas Sakowicz, Seattle, WA (US); Benjamin R Vincent, Kirkland, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 317 days.

(21) Appl. No.: 16/574,032

(22) Filed: Sep. 17, 2019

(65) Prior Publication Data
US 2021/0084040 A1    Mar. 18, 2021

(51) Int. Cl.
*H04L 29/06* (2006.01)
*G06F 9/54* (2006.01)

(52) U.S. Cl.
CPC ............. *H04L 63/10* (2013.01); *G06F 9/547* (2013.01); *H04L 63/0853* (2013.01)

(58) Field of Classification Search
CPC ...... H04L 63/10; H04L 63/0853; G06F 9/547
See application file for complete search history.

(56) References Cited

U.S. PATENT DOCUMENTS

| | | | |
|---|---|---|---|
| 9,300,629 B1 * | 3/2016 | Jahr | H04L 67/02 |
| 9,449,182 B1 * | 9/2016 | Dang | G06F 16/192 |
| 10,523,643 B1 * | 12/2019 | Davis | H04L 63/20 |
| 10,771,458 B1 * | 9/2020 | Xia | H04L 63/0853 |
| 2011/0072039 A1 * | 3/2011 | Tayloe | H04L 63/12 707/769 |
| 2012/0060207 A1 * | 3/2012 | Mardikar | H04L 63/105 726/4 |
| 2017/0286700 A1 * | 10/2017 | Sartor | G06F 21/577 |
| 2018/0211055 A1 | 7/2018 | Balijepalli et al. | |
| 2019/0068627 A1 * | 2/2019 | Thampy | H04L 63/1416 |
| 2020/0099694 A1 * | 3/2020 | Weiss | H04L 63/101 |
| 2020/0364078 A1 * | 11/2020 | Potter | G06F 21/53 |

FOREIGN PATENT DOCUMENTS

EP    2960823 A1    12/2015

OTHER PUBLICATIONS

"International Search Report and Written Opinion Issued in PCT Application No. PCT/US20/038251", dated Oct. 1, 2020, 13 Pages.

* cited by examiner

*Primary Examiner* — Ghodrat Jamshidi

(57) ABSTRACT

A least-privilege permission or permissions is automatically assigned to a client application in order to ensure that the client application is able to perform the bare minimum actions on a resource. The client application accesses the protected resource using a web API. The determination of the least-privilege permission(s) is based on actions previously performed on the resource by the client application. The identity provider monitors the actions performed on a resource by the client application and determines the bare minimum permission needed for the client application.

17 Claims, 4 Drawing Sheets

AUTOMATIC REDUCTION OF PERMISSIONS FOR CLIENT APPLICATIONS

BACKGROUND

The proliferation of the Internet has changed the workplace. An organization's Information Technology (IT) resources may be hosted on a cloud service which enables access from any location, from different types of applications (e.g., web-based application, mobile application, desktop application) and from different types of devices (e.g., mobile, Internet of Things (IoT), desktop, laptop, etc.). For example, a client application on a mobile device or desktop may access a protected resource hosted by the cloud service through a web application programming interface (API). The web API is an interface that can be accessed using web-based protocols, such as the HyperText Transfer Protocol (HTTP) to perform an operation on a protected resource. The client application may be given access to a web API to perform an intended operation on the protected resource through one or more permissions. However, a client application may obtain a permission that contains broad rights beyond those needed to perform its intended task which may present a security risk.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An identity provider authorizes the access of a protected resource by a client application by providing an access token having a permission that allows the client application to perform an action or operation on the protected resource. A bare minimum permission is determined from an analysis of the access history of the operations performed on the protected resource by the client application through web API calls and the operations requested to obtain an access token. The client application is given a recommendation to reduce its access privilege to the bare minimum permission and/or have its authorization reconfigured to the bare minimum permission.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Aspects of the present invention address determining the least-privilege scope or permission needed for a client application to access a protected resource through a web API in a multi-tenant environment. The least-privilege scope ensures that resources accessed through a web API in a multi-tenant cloud service are accessed with the bare minimum permissions. In this manner, the resource is protected from security risks, such as data leakage and data loss which may occur when the client application is given broad permissions that are not needed.

In one aspect, a cloud service hosts the resources of multiple tenants. A tenant is a directory that is associated with an enterprise, organization, group, user or entity that subscribes to the cloud service. A tenant contains resources, such as virtual machines, applications, application programming interfaces (APIs), storage accounts, services, etc. The cloud service may provide an identity platform or provider that manages access to the resources of a tenant. The resources of a tenant are accessible to those customers of the tenant who have permission to access the resource. The identity provider controls authentication of the users and client applications with the cloud service and the authorization of the user/client application to access and use a resource. The client application (e.g., software, module, component, program, automated tool, etc.) may utilize a web API to access a resource of a tenant.

An identity provider is responsible for verifying that a user or client application has the requisite permissions needed to access a resource of a tenant. The client application engages in an authorization process which provides a security token to an authenticated application for its use in accessing a resource through a web API. In one aspect, the authorization process is separate from the authentication process that authenticates a user/client application with the cloud service. The authentication process is used to request permissions that allow a user/client application to perform an operation on a resource.

The client application may request permissions during the authorization process that are not needed or never used. The techniques described herein limit the permissions of an application to the bare minimum permission or permissions that are needed. In one aspect, the bare minimum permissions are determined from the application's historical access patterns. Based on the permissions previously used by the application, the application's permissions may be reduced to allow only those actions used previously.

Attention now turns to a further discussion of the system, devices, components, and methods utilized in an automated least-privilege permission system.

System

Figure 1:
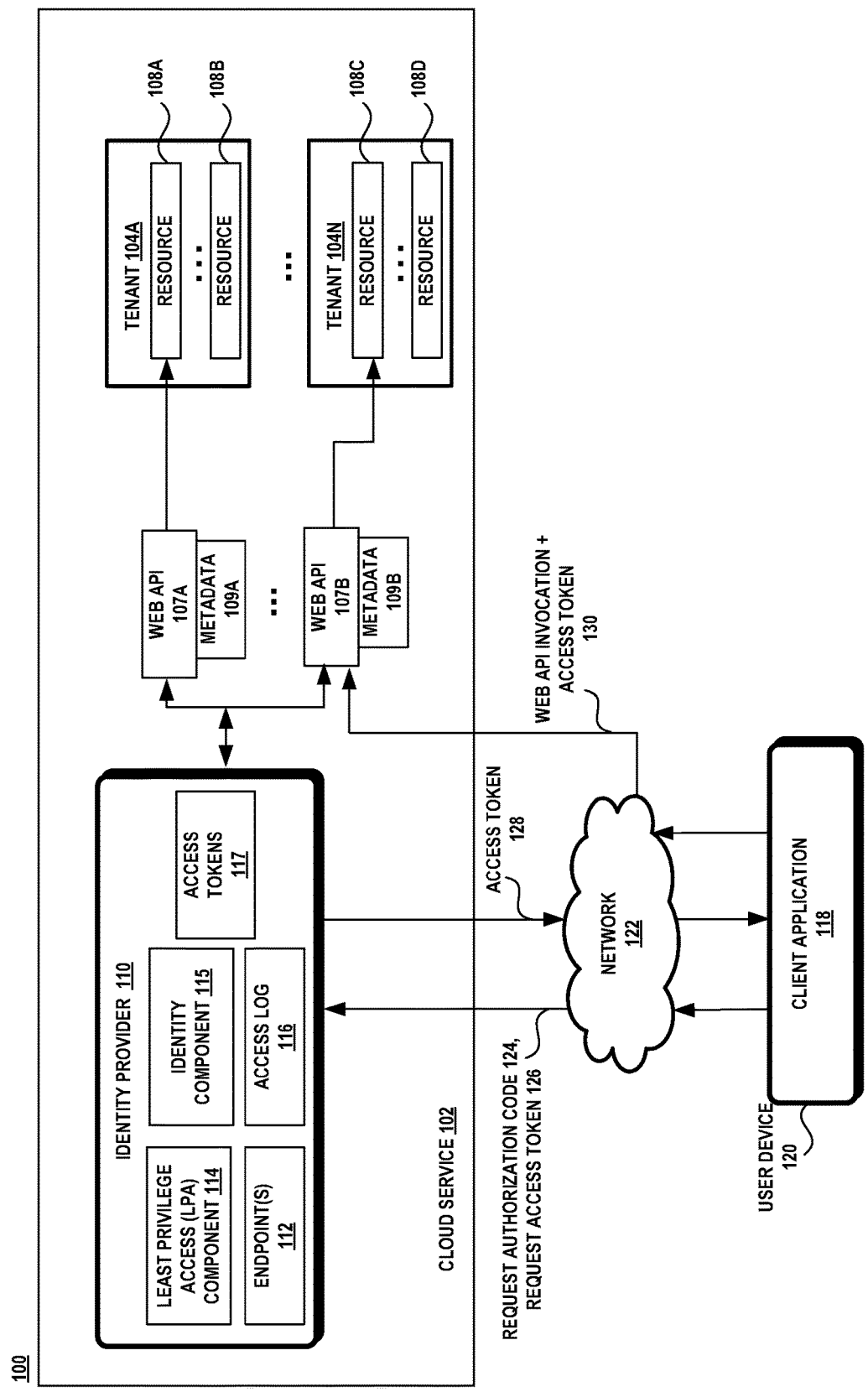
FIG. 1 illustrates an exemplary system to automatically determine the least-privilege permission for a client application to access a protected resource in a multi-tenant environment

FIG. 1 illustrates a block diagram of an exemplary system 100 in which various aspects of the invention may be practiced. The system 100 may be configured with a cloud service 102 that operates within a multi-tenant environment that serves multiple users of the tenants. A cloud service 102 is a service available on demand for users through a publicly-accessible network 122, such as the Internet. A tenant is a directory that is associated with an organization, entity, business unit within an organization, a group of users within an organization, and the like. A tenant hosts resources for use by its users (e.g., customers, end-users, employees, individuals, groups, etc.) As shown in FIG. 1, the cloud service 102 may host multiple tenants 104A-104N with each tenant hosting multiple resources (108A-108D) accessible through a web API (107A-107B).

In one aspect, the web API 107 may be a Representational State Transfer (REST) API. A REST API is a service endpoint that supports a set of HTTP operations or methods, which create, retrieve, update or delete the service's resources. A request is made using a REST API and a response is returned. The request may include a request Uniform Resource Identifier (URI) and a HTTP request message header. The URI may indicate the protocol used to transmit the request (e.g., http, https), the domain name or Internet Protocol (IP) address of the server of the REST service endpoint, the resource path and parameters. The HTTP request message header includes a HTTP method (e.g., GET, HEAD, PUT, POST, and PATCH methods) that tells the service the type of operation that is being requested. The response may include a HTTP response message header and a HTTP response message body. The HTTP response message header may include a status code and other optional data. The HTTP response message body includes the requested data.

The web API may be associated with metadata (109A-109B). The metadata 109 includes the permissions required for usage of the web API. The metadata 109 may change during the life of the web API and include new permissions when additional functionality is added to the web API.

The cloud service 102 includes an identity provider 110 that manages access to the resources hosted by the cloud service 102. The identity provider 110 manages identity information and authenticates users and client applications that seek to access a resource hosted by the cloud service 102. The identity provider 110 may include several endpoints 112, a least-privilege analysis component 114, an identity component 115, an access log 116, and access tokens 117. An endpoint 112 is a network port that is referenced by a uniform resource locator (URL) to receive messages destined to the cloud service and to respond to the messages. There may be multiple endpoints for the cloud service where each endpoint is used to receive different types of messages. For example, there may be an authorization endpoint that receives permission requests, a token endpoint that receives requests for an access token, and an identity endpoint that receives web API registration requests.

The least privilege analysis component 114 tracks the requests made by the client applications and the permissions used by the client applications in order to determine the least-privilege permission that should be granted to a client application. The identity component 115 manages the authorization of a permission to a client application. There is an access log 116 that stores the historical access patterns of each client application.

A third-party application or client application 118 on a client device 120 may access a resource associated with the cloud service 102 using a web API 107. The functionality of a resource may be divided into smaller sub-functions or chunks. Each sub-function requires a permission to access and use the sub-function. For example, access to a calendar may be divided into one sub-function that allows a client application to read the calendar and a second sub-function that allows a client application to write to the calendar. The permissions are requested when the client application is registered with the identity provider and approved by the owner/administrator that controls access to the resource.

In order to facilitate secure access to a resource, the client application 118 registers with the identity provider 110 associated with the cloud service 102. The client application 118 then requests an authorization code 124 having one or more permissions that enable the client application 118 to perform particular operations on a resource. The identity provider 110 ensures that the owner of the resource has consented to the requested permissions. Upon successful authorization, an authentication code is provided to the client application 118 which enables the client application to redeem the authentication code for an access token 126. The access token 128 is used in a web API call 130 to access a protected resource in the manner allowed by the access token.

The access token allows access to a certain defined resource or resources. The access token is not intended to contain information about the end-user and as such differs from an ID token which is a security token that contains information about an end-user. The access token contains the valid permissions for an intended resource and an expiration time. In one aspect, the access token may be implemented as a JSON web token (JWT), a Base-64 encoded JSON object.

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention. For example, this disclosure is not limited to a cloud service and may be practiced with any resource capable of being accessible through a network.

Additionally, the cloud service may be composed of multiple servers that are interconnected via a network. The identity provider and the tenant directories may not be physically located in the same computing device or within the same organization. The identity provider may be configured within one or more servers. The resources hosted by the tenants may be associated with storage devices local to a tenant, within a corporate intranet and network, or stored on storage devices hosted by the cloud service. The aspects of this disclosure are not limited to a particular configuration of a cloud service.

Methods.

Attention now turns to a description of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 2:
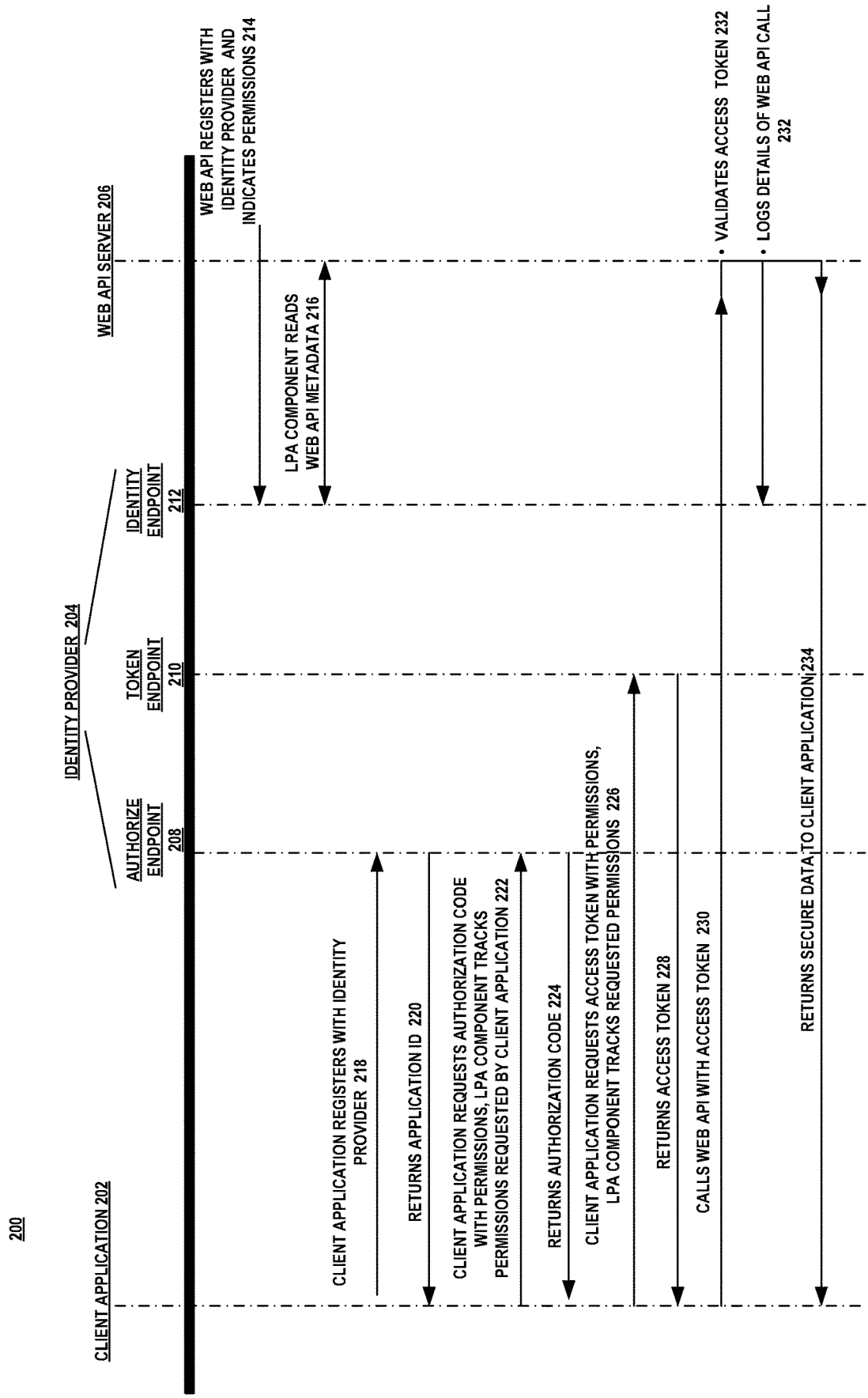
FIG. 2 is a flow diagram illustrating an exemplary authentication method for a client application.

Turning to FIG. 2, there is an exemplary method 200 that illustrates the authorization flow between the client application 202, the identity provider 204, and the web API server 206. In one aspect, the Oauth 2.0 authorization framework is utilized to control access to a HTTP service, either directly or indirectly on behalf of a user. In the OAuth 2.0 protocol, the client application 202 requests access to resources controlled by the resource owner and hosted by the cloud service. The client application 202 is issued a different set of credentials than those of the resource owner. Instead of using the resource owner's credentials to access protected resources, the client obtains an access token—a string denoting a specific permission or scope and other access attributes. Access tokens are issued to the client application by the identity provider with the approval of the resource owner. The client application 202 uses the access token to access the protected resources hosted by the cloud service.

Initially, the web API server 206, hosting a web API, registers with the identity provider 204 and identifies the requisite permissions needed to operate on the resource. For example, Microsoft Graph may register a web API for use to access Office365 calendar data. The permissions required to access the calendar data may include the following: (1) Calendars.Read which allows an application to read events in the calendar; (2) Calendars.ReadWrite which allows an application to create, read, update, and delete events in the calendar; and (3) Calendars.ReadWrite.Shared which allows an application to create, read, update and delete events in all calendars the signed in user has permissions to access and includes delegate and shard calendars. The permissions may be stored in the web API's metadata. (Collectively, block 214).

Additionally, a client application 202 registers with the identity provider 204 by sending a request to an authorization or authorize endpoint 208 (step 218). The request may include a redirect Uniform Resource Identifier (URI) which is used by the identity provider 204 to return responses. The identity provider 204 generates a unique application identifier for the client application which is returned to the client application (step 220).

It should be noted that the client application may register with the identity provider before the web API registers with the identity provider or that both registrations may occur simultaneously.

The client application 202 may then send a request to the authorized endpoint 208 of the identity provider 204 to request an authorization code with certain permissions (step 222). The authorization code indicates whether or not the client application is authorized to access the requested resource with the requested permissions (step 222). The least-privilege permission access (LPA) component tracks the permissions requested by the client application 202 and logs them in the access log (step 222). Upon successful authorization of the client application, the authorization code is returned to the client application (step 224).

The client application 202 may then issue a request to the token endpoint 210 of the identity provider for an access token to access a particular resource with one or more permissions (step 226). The LPA component of the identity provider tracks the permissions requested by the client application (step 226). The identity provider component checks the permissions requested and upon successful validation, the identity provider component returns an access token (step 228). Upon receiving the access token, the client application invokes a web API with the access token to perform an intended operation on a resource (step 230). The web API server 206 validates the access token (step 232) and upon successful validation, the operation is performed and a response is returned back to the client application (step 234). In addition, the web API server 206 logs the details of the web API call in the access log of the identity provider (step 232).

Figure 3:
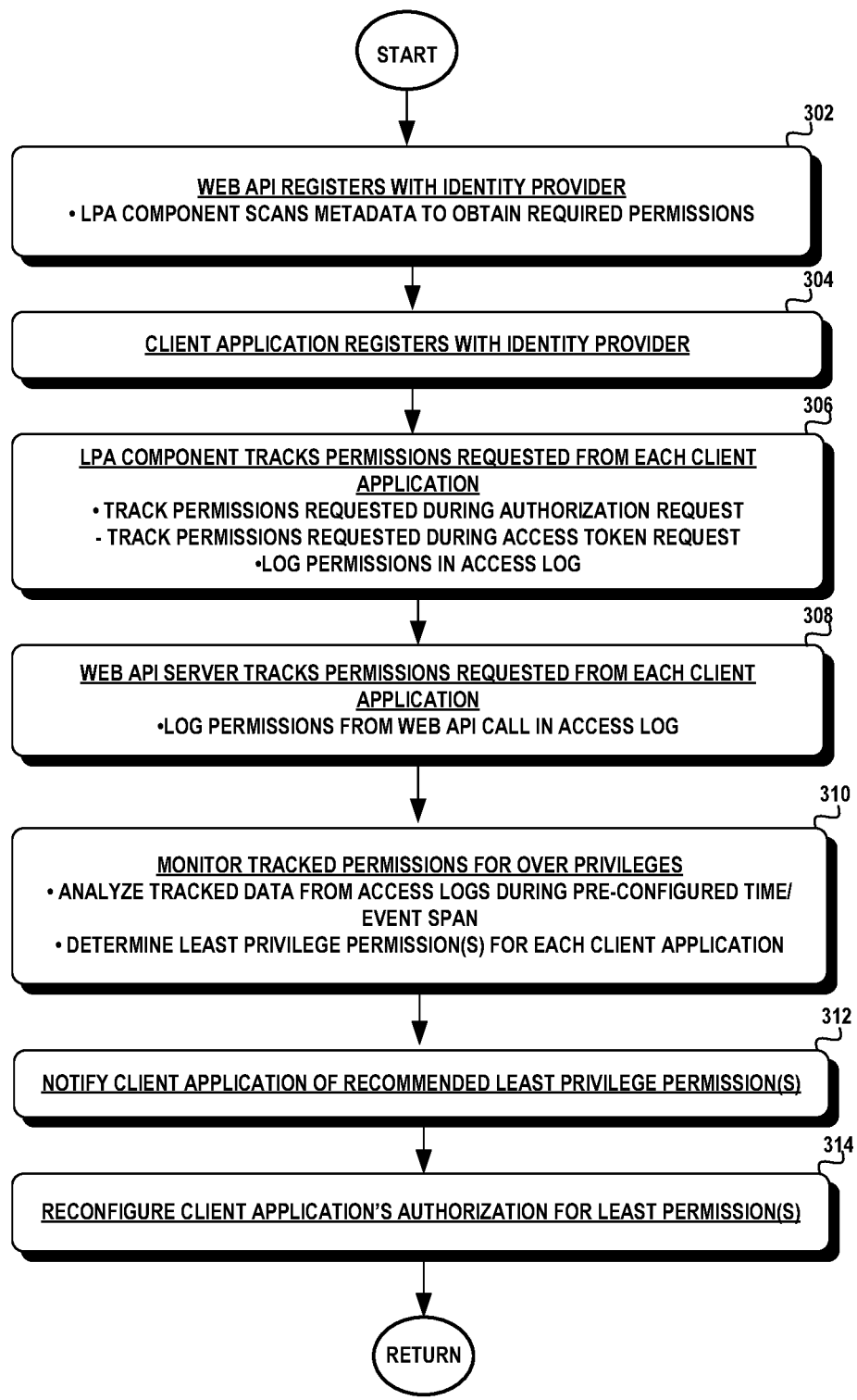
FIG. 3 is a flow diagram illustrating an exemplary method for determining the least-privilege permission for a client application.

FIG. 3 illustrates an exemplary method 300 which describes in further detail the manner in which the LPA component determines the least-privilege permission for a client application. Referring to FIGS. 1 and 3, once the web API registers with the identity provider, the LPA component scans the metadata of the web API to obtain the required permissions associated with the web API (block 302).

The LPA component then tracks each client application that registers with the identity provider. The LPA component obtains the client application identifier from the registration and stores it into the access log (step 304). Each time an authorization request is received by the identity provider, the LPA component tracks the permissions requested by the client application in the access log (step 306). Each time a token request is received by the identity provider, the LPA component tracks the permissions that are requested in the access log for each application identifier (step 308).

At a pre-determined time or event, the LPA component scans the access log to analyze the permissions used by a client application and the permissions originally requested by the client application when the client application requested an authentication code with the permissions associated with the web API. The LPA component may perform this analysis within a pre-configured time span (e.g., once every month, once every two weeks, etc.), upon the occurrence of one or more events (e.g., upon receipt of the tenth authentication request), or any combination thereof. The LPA component determines whether the permissions granted to the client application exceed the permissions actually used by the client application. In this case, the LPA component determines the bare minimum or least privilege permission or permissions needed from the permissions identified in the web API's metadata (Collectively, step 310).

The LPA component may notify the client application of its recommendation and for the client application to reduce its permission or permissions to the least privilege permission (step 312) The LPA component may reconfigure future authorization requests from the client application with the least privilege permission regardless of whether or not the client application consents to the reduction in permissions (step 314).

Exemplary Operating Environment

Figure 4:
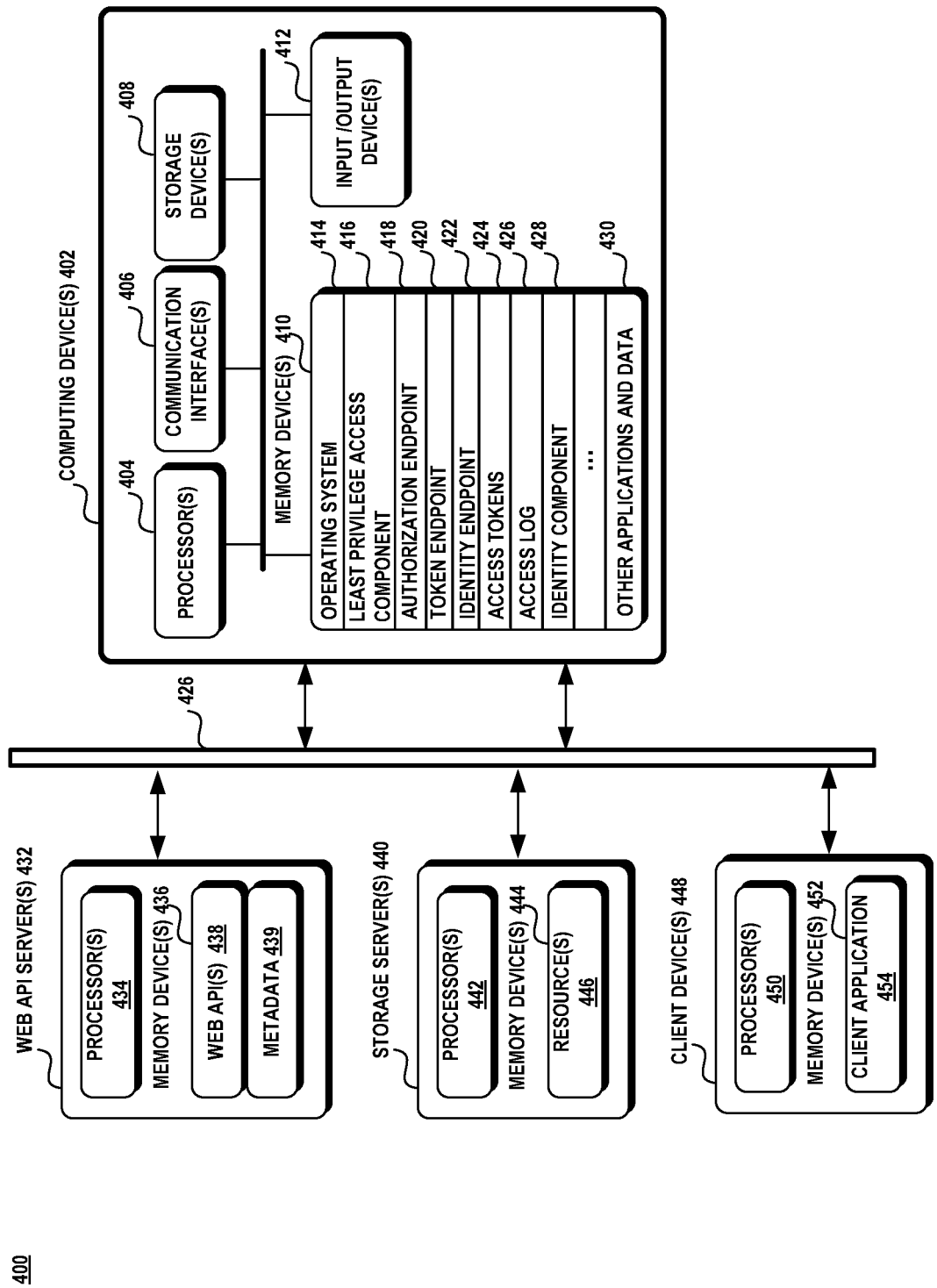
FIG. 4 is a block diagram illustrating an exemplary operating environment.

Attention now turns to a discussion of an exemplary operating environment. FIG. 4 illustrates an exemplary operating environment 400 having computing devices 402, 432, 440 and 448 used to determine the least privilege permission for a client application. However, it should be noted that the aspects disclosed herein is not constrained to any particular configuration of devices. It should be noted that the operating environment is not limited to any particular configuration and other configurations are possible.

In one aspect, computing device(s) 402 may be part of a cloud service. The cloud service may be a network of data processing devices that include one or more computing devices 402. A computing device 402 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, an Internet-of-Things (IOT) device, a distributed computing system, multiprocessor systems, or combination thereof. The operating environment 400 may be configured in a network environment, a distributed environment, a multi-processor environment, or as a combination of one or more stand-alone computing devices having access to remote or local storage devices.

A computing device 402 may include one or more processors 404, one or more communication interfaces 406 one or more storage devices 408, one or more input/output devices 412, and one or more memory devices 410. A processor 404 may be any commercially available central processing unit (CPU), microprocessor, processor core, or customized processor and may include dual microprocessors and multi-processor architectures. The communication interface 406 facilitates wired or wireless communications between the computing device 402 and other devices. A storage device 408 may be computer-readable medium that does not contain propagating signals, such as modulated data signals transmitted through a carrier wave. Examples of a storage device 408 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 408 in the computing device 402. The input/output devices 412 may include a keyboard, mouse, pen, voice input device, touch input device, display, speakers, printers, etc., and any combination thereof.

A memory 410 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 410 may also include one or more external storage devices or remotely located storage devices that do not pertain to propagated signals, such as modulated data signals transmitted through a carrier wave. The memory 410 may include an operating system 414, a least-privilege permission access component 416, an authentication endpoint 418, a token endpoint 420, an identity endpoint 422, access tokens 424, an access log 426, an identity component 428, and other applications and data 430.

The computing device 402 may be communicatively coupled to a network 426. The network 426 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 426 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

The exemplary operating environment may include one or more web API servers 432 that hosts one or more web APIs 432 and their associated metadata 439. A web API server 432 is a computing device, as described above, that has one or more processors 434 and one or more memory devices 436. One or more storage servers 440 may be used to store, access, and manage digital data, files, services, and other various resources 446 associated with a web API 438. A storage server 440 is a computing device, as described above, that has one or more processors 442 and one or more memory devices 444. A client device 448 is a computing device, as described above, that contains a client application 454 that accesses a resource through a web API. The client device 448 contains one or more processors 450 and one or more memory devices 452.

CONCLUSION

A system is described comprising one or more processors, a memory, and one or more programs, wherein the one or more programs are stored in the memory and configured to be executed by the one or more processors. The one or more programs including instructions that: provide a client application a permission to access a protected resource hosted by a multi-tenant cloud service; track requests made by the client application to access the protected resource; determine from the tracked requests a bare minimum permission needed to implement actions found in the tracked requests; and reconfigure the client application with the bare minimum permission. In one aspect, the tracked requests include permissions requested by the client application during an authorization process with the multi-tenant cloud service. In one aspect, the tracked requests include permissions made in a web API call to the protected resource. In one aspect, the bare minimum permission includes multiple permissions.

In one aspect, the one or more programs include further instructions that provide the client application with a recommended permission for the client application to use in further requests made by the client application. In one aspect, the one or more programs include further instructions that determine the bare minimum permission at a pre-determined time or event interval. In one aspect, the permission is embedded in an access token.

A device is disclosed comprising at least one processor and a memory. In one aspect, the least one processor is configured to: provide a client application with an access token, the access token including a permission that allows a plurality of operations to be performed on a resource hosted by a multi-tenant cloud service; track operations performed on the resource made through one or more web application programming interface (API) calls to the resource, wherein the one or more web API calls include the access token; and based on the tracked operations, determine a bare minimum permission for the client application, wherein the bare minimum permission reduces a number of the plurality of operations authorized to be performed on the resource.

In one aspect, the tracked operations include operations requested by the client application to obtain the access token. In one aspect, the at least one processor is further configured to: reconfigure the client application to be authorized only for the bare minimum permission. In one aspect, the at least one processor is further configured to: obtain one or more required permissions associated with the web API, wherein a required permission contains at least one authorized operation to be performed on the resource. In one aspect, the at least one processor is further configured to: utilize the one or more required permissions to determine the bare minimum permission. In one aspect, the web API is a Representational State Transfer (REST)-based API. In one aspect, the at least one processor is further configured to: provide a recommendation for the client application to utilize the bare minimum permission. In one aspect, the access token is a JSON web object.

A method is disclosed that performs actions comprising: receiving, at a computing device having a processor and a memory, a request for an access token, the access token including a first permission that allows the client application to perform one or more operations on the protected resource; tracking the operations performed on the protected resource by the client application; determining a bare minimum permission for the client application based on the tracked operations; and reconfiguring the first permission to include only the bare minimum permission.

In one aspect, the method further comprises tracking the operations specified in a web API call to the protected resource. In one aspect, the method further comprises tracking the operations requested in the request for the access token. In one aspect, the method further comprises generating a response to the client application recommending the bare minimum permission. In one aspect, the method further comprises embedding the access token in a web API call that initiates an operation on the protected resource.

While this specification contains many specific implementation details, these should not be construed as limitations on the scope of what may be claimed, but rather as descriptions of features that may be specific to particular implementations. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the combination may be directed to a subcombination or variation of a sub-combination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
one or more processors; and a memory;
one or more programs, wherein the one or more programs are stored in the memory and configured to be executed by the one or more processors, the one or more programs including instructions to perform actions that:
provide a client application a permission to access a protected resource hosted by a multi-tenant cloud service;
track requests made by the client application to access the protected resource;
determine from the tracked requests a bare minimum permission needed to implement actions found in the tracked requests; and
reconfigure the client application with the bare minimum permission or provide the client application with the bare minimum permission as a recommendation for the client application to use in further requests made by the client application.

2. The system of claim 1, wherein the tracked requests include permissions requested by the client application during an authorization process with the multi-tenant cloud service.

3. The system of claim 1, wherein the tracked requests include permissions made in a web Application Programming Interface (API) call to the protected resource.

4. The system of claim 1, wherein the bare minimum permission includes multiple permissions.

5. The system of claim 1, wherein the one or more programs include further instructions to perform actions that determine the bare minimum permission at a pre-determined time or event interval.

6. The system of claim 1, wherein the permission is embedded in an access token.

7. A device, comprising:
at least one processor and a memory;
wherein the at least one processor is configured to perform acts that:
provide a client application with an access token, the access token including a permission that allows a plurality of operations to be performed on a resource hosted by a multi-tenant cloud service;
track operations performed on the resource made through one or more web application programming interface (API) calls to the resource, wherein the one or more web API calls include the access token;
based on the tracked operations, determine a bare minimum permission for the client application, wherein the bare minimum permission reduces a number of the plurality of operations authorized to be performed on the resource; and
provide a recommendation for the client application to utilize the bare minimum permission.

8. The device of claim 7, wherein the tracked operations include operations requested by the client application to obtain the access token.

9. The device of claim 7, wherein the at least one processor is further configured to perform acts that:
reconfigure the client application to be authorized only for the bare minimum permission.

10. The device of claim 7, wherein the at least one processor is further configured to perform acts that:
obtain one or more required permissions associated with the web API, wherein a required permission contains at least one authorized operation to be performed on the resource.

11. The device of claim 10, wherein the at least one processor is further configured to perform acts that:
utilize the one or more required permissions to determine the bare minimum permission.

12. The device of claim 7, wherein the web API is a Representational State Transfer (REST)-based API.

13. The device of claim 7, wherein the access token is a JavaScript Object Notation (JSON) web object.

14. A method, comprising:
receiving, at a computing device having a processor and a memory, a request for an access token, the access token including a first permission that allows the client application to perform one or more operations on a protected resource hosted in a multi-tenant cloud service;

tracking the operations performed on the protected resource by the client application;

determining a bare minimum permission for the client application based on the tracked operations;

generating a response to the client application recommending the bare minimum permission; and reconfiguring the first permission to include only the bare minimum permission.

15. The method of claim 14, further comprising:
tracking the operations specified in a web Application Programming Interface (API) call to the protected resource.

16. The method of claim 14, further comprising:
tracking the operations requested in the request for the access token.

17. The method of claim 14, further comprising:
embedding the access token in a web API call that initiates an operation on the protected resource.

* * * * *